United States Patent
Yuuki et al.

(10) Patent No.: US 7,057,638 B1
(45) Date of Patent: Jun. 6, 2006

(54) STEREOSCOPIC IMAGE DISPLAY APPARATUS

(75) Inventors: Akimasa Yuuki, Tokyo (JP); Tomohiro Sasagawa, Tokyo (JP); Kyoichiro Oda, Tokyo (JP); Yutaka Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/918,342

(22) Filed: Aug. 16, 2004

(51) Int. Cl.
*H04N 13/04* (2006.01)
*H04N 15/00* (2006.01)
*H04B 1/66* (2006.01)

(52) U.S. Cl. .................... 348/51; 375/240; 375/240.01
(58) Field of Classification Search .................. 348/55; 345/98
See application file for complete search history.

(56) References Cited

U.S. PATENT DOCUMENTS 5,821,989 A * 10/1998 Lazzaro et al. ............... 348/56
5,931,764 A * 8/1999 Freeman et al. ............... 482/4
5,945,972 A * 8/1999 Okumura et al. ............. 345/98
2002/0057241 A1  5/2002 Oda et al.

FOREIGN PATENT DOCUMENTS

JP        2001-66547       3/2001
WO    WO 2004/027492   4/2001

* cited by examiner

*Primary Examiner*—Vivek Srivastava
*Assistant Examiner*—Justin Shepard
(74) *Attorney, Agent, or Firm*—Leydig, Voit & Mayer, Ltd.

(57) ABSTRACT

A stereoscopic image display apparatus having a low image data input rate, in which the required capacity of a memory is reduced without causing flicker and ghosts. In the invention, right and left parallax image data is compressed, the compressed image data is stored in a frame memory, each of compressed image data for a right eye and compressed image data for a left eye, corresponding to the same display gate line, is read and decoded, line by line, and parallax image data for the right and left eyes for one frame are displayed multiple times, as alternating right and left fields, within one frame period.

3 Claims, 4 Drawing Sheets

FIG. 3 gradation value conversion table

|  | current frame image data ||||||
|---|---|---|---|---|---|---|
|  | gradation / gradation | 0 | 1 | 2 | ———————— | 225 |
| preceding frame image data | 0 | | | | | |
| | 1 | | | →3 | | |
| | 2 | | | | | |
| | ⋮ | | | output data | | |
| | 225 | | | | | |

STEREOSCOPIC IMAGE DISPLAY APPARATUS

BACKGROUND OF THE INVENTION

The present invention relates to a stereoscopic image display apparatus.

FIG. 4 shows an example of a conventional alternating-field liquid crystal stereoscopic display apparatus. The liquid crystal stereoscopic display apparatus has two light sources for emitting light to the right and left eyes. At the time of displaying an image for right eye on a liquid crystal display panel, a light source 2a for emitting light to right eye 4 is synchronously turned on. At the time of displaying an image for the left eye, a light source 2b for emitting light to left eye 3 is synchronously turned on. Parallax images for the right and left eyes are alternately displayed, thereby displaying a stereoscopic image (refer to, for example, Japanese Patent Application Laid-Open No. 2001-66547 (p. 3 to 4, FIG. 1)).

In particular, in the case of using the conventional alternating-field liquid crystal stereoscopic display apparatus for a portable telephone, since the input rate of image input data is low as 24 times (frames) per second due to limitations of the capability of wireless communication, power consumption, and processing speed of the CPU, a problem of flickering in an image occurs. In order to display a stereoscopic image in which flickering does not occur, it is necessary to display right and left parallax images at a rate close to 60 times per second, that is, a rate close to 120 times/second in total.

The response speed of the liquid crystal material is not high enough to provide such a high-speed display and there is also a problem that ghosting will occur due to a delay in the response of the liquid crystal material to driving signals.

SUMMARY OF THE INVENTION

The present invention provides an alternating-field stereoscopic image display apparatus for displaying a stereoscopic image by alternately displaying right and left parallax image data, wherein right and left parallax image data is compression coded, the compressed image data is stored in a frame memory, each of compressed image data for the right eye and compressed image data for the left eye corresponding to a same displaying gate line is read and decoded on a gate line unit basis, and input parallax image data for the right and left eyes for one frame are displayed a plurality of times as alternating right and left fields within one frame period.

One of the compressed image data for the right eye and the compressed image data for the left eye of a same gate line read at the time of the decoding is used as an image data which was displayed in the immediately preceding field in order to compensate a gradation value of response of liquid crystal at a time of displaying the other compressed image data as the current input compressed image data.

BRIEF DESCRIPTION OF THE DRAWINGS

FIG. 3 is a diagram showing a gradation value conversion table of the stereoscopic image display apparatus of the invention.

DETAILED DESCRIPTION

EMBODIMENT 1

Figure 1:
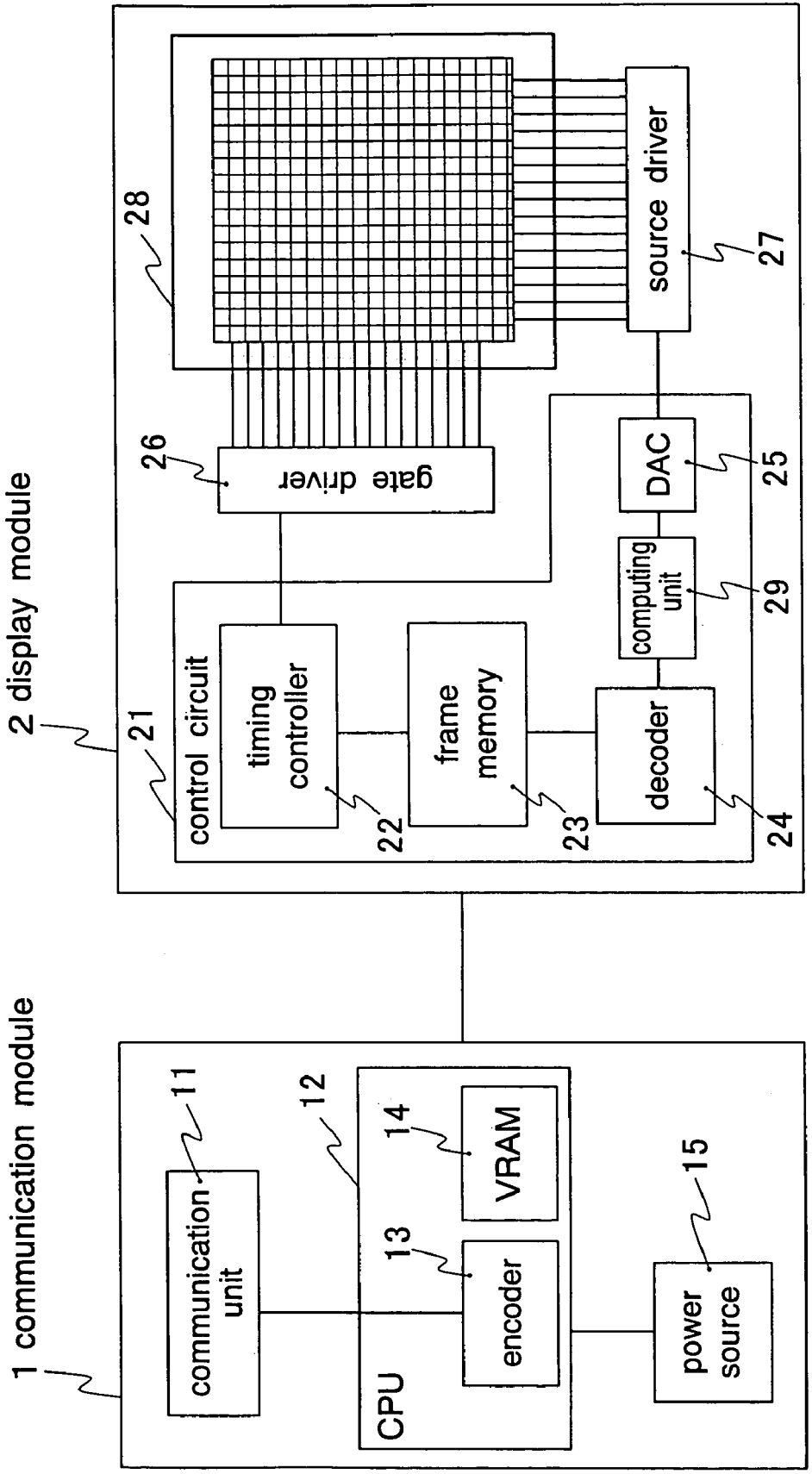
FIG. 1 is a diagram showing the configuration of a stereoscopic image display apparatus of the invention.

FIG. 1 shows the configuration of an embodiment of a stereoscopic image display apparatus of the invention. The configuration shown in FIG. 1 relates to the case where the invention is applied to a portable telephone capable of displaying a stereoscopic image, which has a communication module 1 and a display module 2.

The communication module 1 has a communication unit 11, a CPU 12, an encoder 13, a VRAM (video memory) 14, and a power source 15 such as a battery. The display module 2 has a control circuit 21, a timing controller 22, a frame memory 23, a decoder 24, a DAC (Digital to Analog Converter) 25, a gate driver 26, a source driver 27, a liquid crystal display panel 28, and a computing unit 29.

Figure 4:
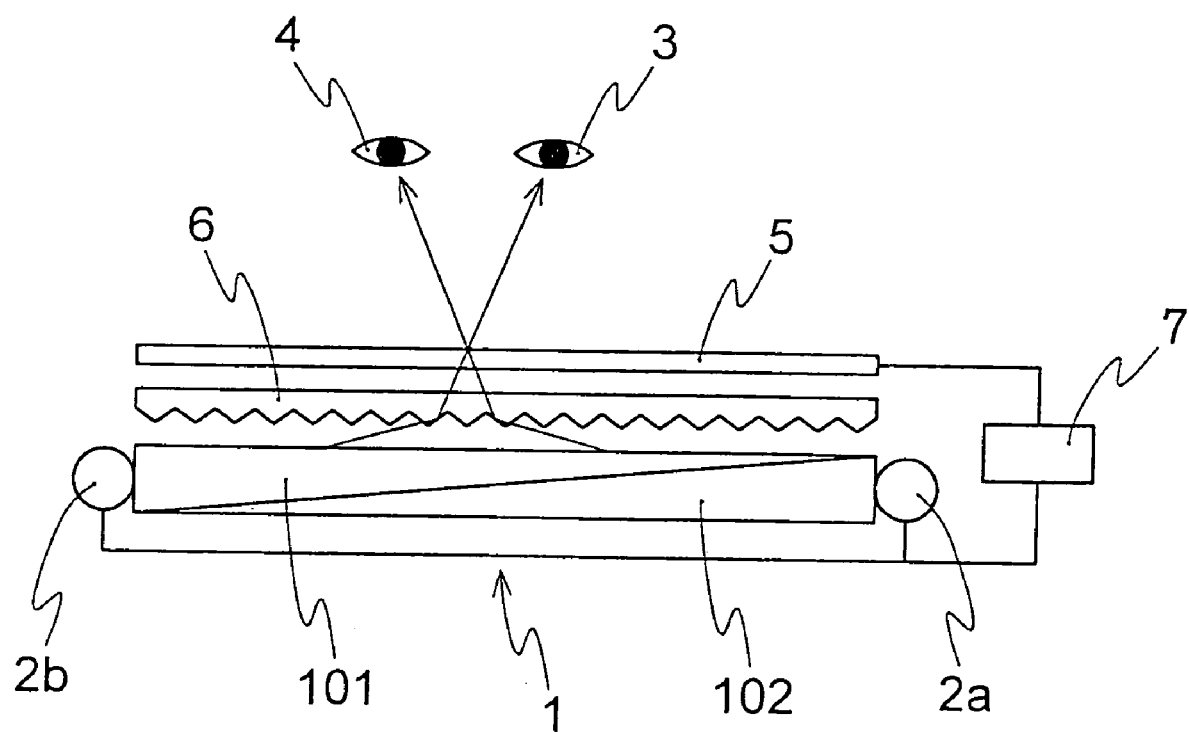
FIG. 4 is a diagram illustrating a stereoscopic image display panel used for the stereoscopic image display apparatus of the invention.

The liquid crystal display panel 28 has, like the one shown in FIG. 4, a liquid crystal display for alternately displaying right and left parallax images and two light sources of a light source for emitting light to the left eye at the time of displaying an image for the left eye and a light source for emitting light to the right eye at the time of displaying an image for the right eye synchronously with the right and left parallax images.

The communication unit 11 in the communication module 1 receives stereoscopic image data of an image for the right eye and an image for the left eye from a transmitter. The stereoscopic image data is decoded by the CPU 12, thereby temporarily obtaining complete image data for the right eye and complete image data for the left eye. The input rate of input image data is limited by the processing capability of the CPU and the communication speed and is, for example, 24 times per second for each of the right and left eyes.

The encoder 13 of the CPU 12 again compression-encodes the decoded image data for the right eye and the decoded image data for the left eye by run length coding, Huffman coding, discrete cosine transform, or the like. The encoded data is recorded together with parameters for data decoding into the VRAM 14.

At this time, the image data for the right eye and the image data for the left eye to be displayed in the same display position, that is, the same gate line is set in one group and compressed, and the compressed data is recorded on the VRAM 14. By using common parameters as the compressing and decoding parameters for the right and left image data, the data amount can be reduced.

The compressed parallax image data recorded on the VRAM 14 is transferred together with the parameters for data decoding to the frame memory 23 in the display module 2 and recorded.

The display module 2 has to display each of the right and left images at a rate of at least 40 times per second in order to suppress flicker. By displaying each of the right and left input parallax image data of 24 times (frames) per second synchronously with the clocks of the timing controller 22 so as to repeat twice in one frame period, each of the right and left images is displayed at a rate of 48 fields/second. A flicker-free image of total 96 fields/second is displayed.

In the case of displaying the image for the right eye, the image data for the right eye is read in line by line manner from the frame memory 23 and is decoded by the decoder 24 by using the recorded parameters for decoding, thereby obtaining the image data for the right eye. The decoded image data for the right eye is stored in a line memory. The data stored in the line memory is sequentially D/A converted. The data is stored in a latch circuit in the source driver 27 and is applied as a gradation voltage to a pixel on a gate line synchronously with a clock of the timing controller 22 and selection of the gate line by the gate driver 26. The operation is repeated for each of the gate lines, thereby displaying an image field for the right eye. After that, similar processes are performed on the image data for the left eye, thereby displaying an image field for the left eye. A pair of the input image data for right and left eyes for one frame are displayed alternately in two fields each to display pixels of one frame.

In the above case, at the time of compressing the image data for the right and left eyes, each of the image data is compressed as a complete image and recorded in the VRAM. It is also possible to handle, for example, the image data for the right eye as complete image data, and compress the difference between the image data for the right eye and the image data for the left eye as the image data for the left eye, and record the compressed data.

In this case, the image data for the right eye and the image data for the left eye to be displayed in the same display position, that is, the same gate line are set in one group and compressed with the same parameters, and the compressed data is recorded in the VRAM 14. At this time, the image data for the right eye is recorded as it is, and the difference data between the image data for the left eye and the image data for the right eye are recorded as the image data for the left eye.

The compressed parallax image data recorded in the VRAM 14 is transferred together with the parameters for data decoding to the frame memory 23 in the display module 2 and recorded.

The data of two gate lines of the compressed image data for the right eye and the compressed image data for the left eye set in one group and to be displayed in the same display position (gate line) are read out from the frame memory 23 and decoded by the decoder 24 by using the recorded parameters for decoding, thereby obtaining the image data for the right eye and the difference data between the image for the right eye and the image for the left eye. In the case of displaying the image for the right eye, the image data for the right eye is stored as it is in the line memory. In the case of displaying the image for the left eye, the difference data is added to the image data for the right eye to thereby obtain the image data for the left eye. The obtained image data for the left eye is stored in the line memory. The data stored in the line memory is sequentially D/A converted. The data obtained is stored in the latch circuit of the source driver 27 and applied as a gradation voltage to pixels on the gate line synchronously with the clock of the timing controller 22 and selection of the gate line by the gate driver 26. The operation is repeated line by line on the gate line, thereby displaying an image of one field. A pair of the input image data for right and left eyes for one frame is displayed alternately in two fields each to display an image of one frame.

A backlight of the liquid crystal display panel 28 includes a backlight for emitting light to the right eye and a backlight for emitting light to the left eye. Each of the backlights is divided into a plurality of backlights in the direction parallel with the gate lines, and the plurality of backlights are sequentially turned on from the top gate line to the bottom gate line synchronously with writing of image data to the display panel 28. At the time of sequentially writing the image for the right eye from the top gate line of the display panel 28, the backlights for emitting light to the right eye are sequentially turned on from top to bottom synchronously with writing. After that, at the time of writing the image for the left eye from the top gate line of the display panel 28, the backlights for emitting light to the right eye are turned off just before the writing. Synchronously with sequential writing of the image for the left eye from the top gate line of the display panel, the backlights for emitting light to the left eye are sequentially turned on from top to bottom. By this operation, only a responded region in the liquid crystal display panel 28 is sequentially visually recognized from top to bottom. Thus, a clear stereoscopic image free from ghost and an after image can be displayed.

With the configuration of the embodiment, the frame memory 23 stores compressed image data. Consequently, different from a frame image memory for storing decoded complete image data, the required capacity of the frame memory can be reduced.

It has been described that the input image data for the right and left eyes is input from the communication module 24 times per second and each of the right and left images is displayed 48 times per second. The necessary number of times is at least 40 times per second for each of the right and left eyes to suppress flicker. If the number of times is 80 times per second, it is sufficient.

The communication module and the display module may operate asynchronously with each other by a method of providing a timing controller for each of the modules and providing the timing controller of the display module with a function of detecting the data transfer timing.

Although the embodiment has been described as an example of applying the stereoscopic display apparatus for alternately displaying right and left parallax images by using the liquid crystal display panel for a portable telephone, the image display apparatus is not limited to the liquid crystal panel but an organic EL display apparatus or the like can be also used. The electronic apparatus is not limited to the portable telephone but a personal computer, a portable game device, a PDA, or the like can be also used.

EMBODIMENT 2

A second embodiment solves a problem that response rate of a liquid crystal is insufficient for frame display of higher speed in the case where a liquid crystal display apparatus displays a flicker-free stereoscopic image by increasing the number of displaying times of frames (fields).

In a method of displaying a stereoscopic image by alternately displaying right and left parallax images, generally, the same object to be displayed in an image for the right eye and that in an image for the left eye are displayed in positions slightly deviated from each other. In the case of alternately displaying the objects to be displayed which are in the deviated positions, the luminance of each pixel is requested to be changed each time the image for the right eye and the image for the left eye are switched even for a still image, in a manner similar to the case of a moving image. In the case where the response speed of the liquid crystal is insufficient, a problem such as ghost or blurring of an outline occurs.

As a method for solving such a problem, the gradation value of input image data in the current field and that of image data in a field displayed just before are compared with each other. A gradation voltage signal for emphasizing a gradation change from the preceding field to the current field to be displayed is generated as a gradation voltage signal for displaying an image in the latest field and is applied to the liquid crystal. In such a manner, a delay of response to a gradation change can be compensated. As means for generating the gradation voltage signal for emphasizing a gradation change, a gradation value conversion table as shown in FIG. 3 is used and a gradation voltage signal optimum to change the present display state of the liquid crystal to the gradation to be displayed next is generated by the computing unit 29 in FIG. 1. For example, when the gradation value of a pixel in the preceding field is "1" and a gradation value to be displayed on the same pixel in the latest field is "2", a gradation voltage signal corresponding to a gradation value "3" is output as the gradation voltage signal to be applied to the liquid crystal.

To apply the gradation compensating method to the stereoscopic image display method of the first embodiment, each of the image data for the right eye and the image data for the left eye to be displayed in the same gate line is grouped for each gate line and compressed with the same parameters and the compressed data is recorded on the VRAM 14. The compressed image data for the right and left eyes is transferred together with the decoding parameters to the frame memory 23 in the display module. A pair of the compressed image data for the right eye and the compressed image data for the left eye to be displayed on the same gate line is read from the frame memory 23 and decoded by the decoder 24, thereby obtaining the complete image data for the right eye and the complete image data for the left eye. Before storing the data to the line memory, a gradation value is compensated by using the gradation value conversion table. At this time, to compensate the image data for the right eye, the image data for the left eye is used as image data in the immediately preceding field. To compensate the image data for the left eye, the image data for the right eye is used as image data in the immediately preceding field.

Figure 2:
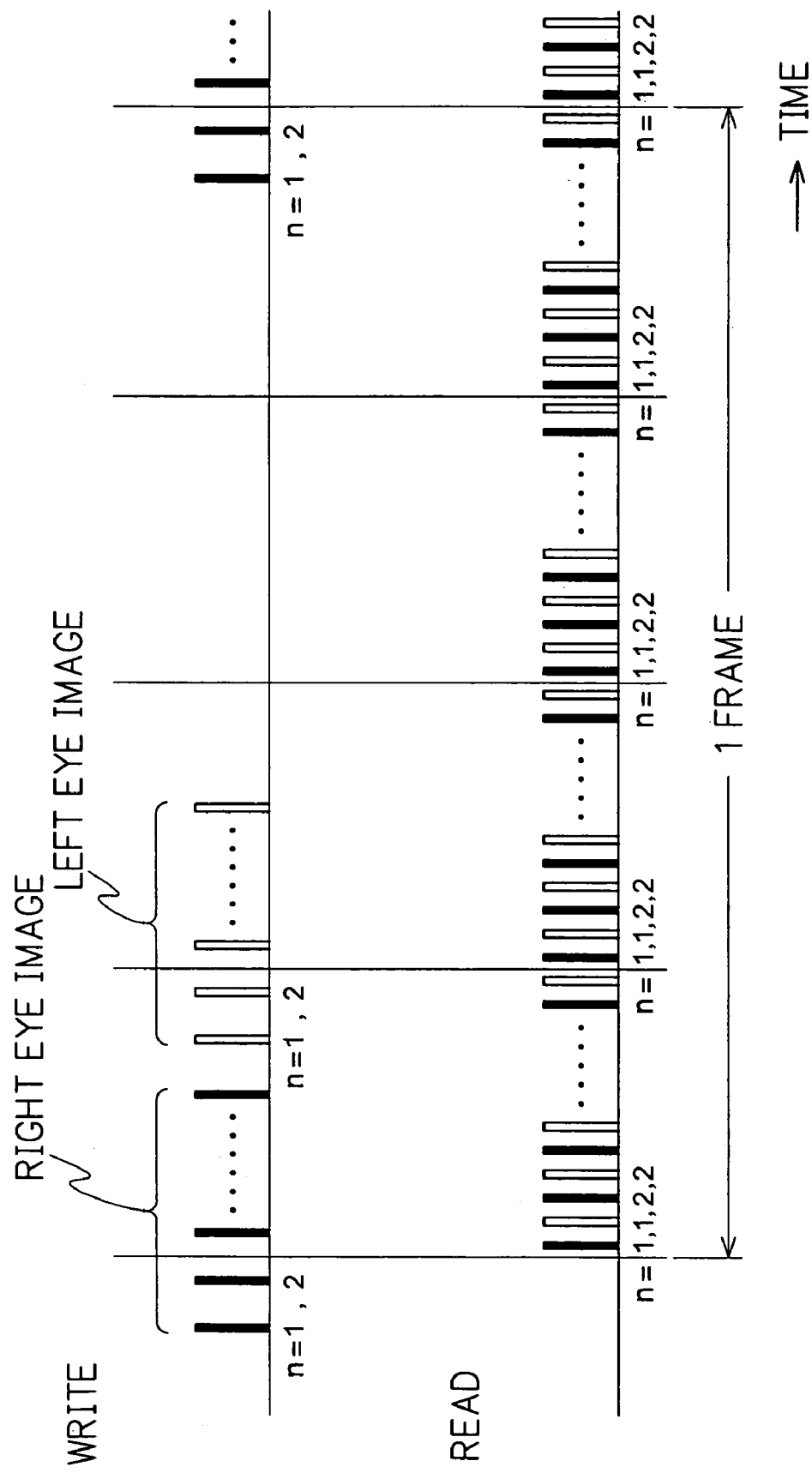
FIG. 2 is a diagram showing timings of moving image data processes of the stereoscopic image display apparatus of the invention.

When the input image data is a moving image, each of the image data for the right eye and the image data for the left eye to be displayed in the same gate line is grouped for each gate line and compressed with the same parameters. The compressed image data is recorded on the VRAM 14. The compressed parallax image data recorded on the VRAM is transferred to the frame memory 23 in the display module 2. At the time of transfer, first, the image data of one field for the right eye is written in the frame memory. After that, with a predetermined time delay, the compressed image data of one field for the left eye is written. The time delay is provided to leave the image data for the left eye, which was displayed just before as the image data for the left eye, in the same display position to be read simultaneously with the image data for the right eye at the time of decoding the image data. In such manner, the gradation compensation for accelerating the response of the liquid crystal material can be executed without interruption. Therefore, after completion of reading of one field of the image data for the right eye, the image data for the left eye are written in the frame memory to update the data. At this time, the decoding parameters for decoding compressed image data of each group is simultaneously transferred and recorded in the frame memory. FIG. 2 shows timings of writing and reading of data at the time of displaying a moving image. The order of inputting the image data for the right and left eyes may be reversed.

A method of processing data for display is similar to that in the first embodiment.

According to the invention, no flicker or ghost occurs even in a stereoscopic image display apparatus having a low image data input rate, and a stereoscopic image display apparatus in which the required capacity of a frame memory is small can be provided.

What is claimed is:

1. An alternating-field stereoscopic image display apparatus for displaying a stereoscopic image by alternately displaying right and left parallax image data, comprising:

compression means for compressing right and left parallax image data corresponding to one display gate line as one group, using identical compressing and decoding parameters, to produce compressed image data, first storing means for storing the compressed image data corresponding to one display gate line, together with the compressing and decoding parameters, second storing means for storing the compressed image data, for storing one of right and left compressed image data first, and for storing the other of the right and left compressed image data after a predetermined time period, reading and decoding means for reading and decoding the compressed image data stored in the second storing means for each of the right eye and the left eye and corresponding to one display gate line, line-by-line, gradation value conversion means for compensating delay in response of a liquid crystal material by emphasizing a gradation change between compressed image data for a current field and compressed image data for an immediately preceding field two fields constituting a frame, and display means for displaying input parallax image data for the fields corresponding to the right eye and the left eye a plurality of times, as alternating right and left fields, within one frame.

2. The stereoscopic image display apparatus of claim 1, wherein the gradation value conversion means comprises a gradation conversion table correlating gradation changes between a current field and an immediately preceding field for generating a gradation voltage signal for emphasizing a gradation change between a current field and an immediately preceding field to compensate for the delay in response of the liquid crystal material, using one of the right image data and the left image data of the present field and the other of the right image data and the left image data of the immediately preceding field.

3. The stereoscopic image display claim 1 comprising a plurality of backlights for emitting light to the right eye and to the left eye, respectively divided along the direction of arrangement of the gate lines, and sequentially turned on from a top gate line to a bottom gate line, synchronously with writing order of the parallax image data to the display means.

* * * * *